(12) United States Patent
Anderson et al.

(10) Patent No.: US 12,479,576 B2
(45) Date of Patent: Nov. 25, 2025

(54) PAYLOAD CONTAINER FOR PARACHUTE DELIVERY SYSTEMS

(71) Applicant: Zipline International, Inc., South San Francisco, CA (US)

(72) Inventors: Ethan C. Anderson, Redwood City, CA (US); Lauren E. Lacey, Redwood City, CA (US); Wilmer A. Baron, San Francisco, CA (US)

(73) Assignee: Zipline International Inc., South San Francisco, CA (US)

( * ) Notice: Subject to any disclaimer, the term of this patent is extended or adjusted under 35 U.S.C. 154(b) by 0 days.

(21) Appl. No.: 18/628,323

(22) Filed: Apr. 5, 2024

(65) Prior Publication Data

US 2024/0336360 A1   Oct. 10, 2024

Related U.S. Application Data

(60) Provisional application No. 63/457,493, filed on Apr. 6, 2023.

(51) Int. Cl.
*B64D 1/12* (2006.01)
(52) U.S. Cl.
CPC .................................. *B64D 1/12* (2013.01)

(58) Field of Classification Search
CPC ............ B64U 2101/64; B64U 2201/10; B64U 2101/69; B64D 1/12
See application file for complete search history.

(56) References Cited

U.S. PATENT DOCUMENTS

| | | | | |
|---|---|---|---|---|
| 1,618,613 | A * | 2/1927 | Turner | A63H 33/20 446/49 |
| 4,134,227 | A * | 1/1979 | Kupperman | A63H 33/20 446/53 |
| 9,138,604 | B2 * | 9/2015 | Cleary | B64D 1/16 |
| 9,375,591 | B2 * | 6/2016 | Goddard | A62C 3/0235 |
| 10,745,130 | B2 * | 8/2020 | Potter | B64D 1/14 |
| 2007/0090174 | A1 * | 4/2007 | Goddard | A62C 3/0235 169/34 |
| 2017/0327236 | A1 * | 11/2017 | Mastrolia | B64D 17/58 |
| 2021/0245882 | A1 * | 8/2021 | Jarvis | G08G 5/54 |

* cited by examiner

*Primary Examiner* — Valentina Xavier
(74) *Attorney, Agent, or Firm* — Dorsey & Whitney LLP

(57) ABSTRACT

Containers and parachutes for payloads to be delivered via an aerial delivery system are disclosed. In one example, a system for aerial delivery of a payload includes a parachute having a canopy, a plurality of legs extending from the canopy, one or more attachment features arranged on an end of the legs. The system also includes a payload container with a plurality of anchors and where the plurality of anchors are integral with the payload container and receive the one or more attachment features.

17 Claims, 10 Drawing Sheets

PAYLOAD CONTAINER FOR PARACHUTE DELIVERY SYSTEMS

CROSS REFERENCE TO RELATED APPLICATIONS

This application claims the benefit of U.S. Provisional Application No. 63/457,493, filed Apr. 6, 2023, the disclosure of which is incorporated by reference in its entirety and for all purposes.

FIELD

The described embodiments relate generally to delivery systems and more specifically for containers for payloads to be delivered via an aerial delivery system.

BACKGROUND

Aerial vehicles are becoming a viable option for package delivery vehicles. Such aerial vehicles can take many forms, such as, but not limited to, rotorcraft (e.g., helicopters, quadrotors, and so on) as well as fixed-wing aircraft. Conventionally, aerial delivery systems have attempted to carry the payloads and packaging directly to the delivery location (e.g., land the aerial vehicle at the delivery location). However, high energy consumption required for takeoffs and landings limits the range and thus effectiveness of such systems. Alternative systems drop packages from above a location. However, these systems often use complex packages requiring skilled employees, significant assembly time, and/or generate considerable waste.

As aerial vehicles are more frequently used to delivery packages, there is a need for efficient packaging solutions that may be readily and repeatedly assembled. There is also a need for packaging solutions that limit waste or utilize recyclable materials to reduce waste associated with delivery systems.

SUMMARY

In one example, a system for aerial delivery of a payload is provided. The system may include a parachute including a canopy, a plurality of legs extending from the canopy, and one or more attachment features arranged on an end of the legs. The system may also include a payload container including a plurality of anchors, wherein the plurality of anchors are integral with the payload container and receive the one or more attachment features.

In one example, a system for aerial delivery of a payload may include a parachute including one or more attachment features and a payload container including a plurality of panels arranged to define an internal volume for housing a payload, wherein a first panel is partially covered by a second panel, a plurality of anchors, wherein the anchors are located on the first panel and receive the one or more attachment features, and wherein the second panel supports the first panel and the plurality of anchors.

In one example, a method for the aerial delivery of a payload may include receiving an order providing a payload size and a payload destination, selecting a payload container to receive the payload from a plurality of payload container sizes, selecting a parachute corresponding to the payload size or payload container, wherein the parachute is folded for deployment, partially assembling the payload container and attaching the parachute to the payload container, wherein an attachment feature of the parachute is attached to a first panel of the payload container, finishing assembly of the payload container including covering the first panel with a second panel, the second panel supporting the first panel, placing the payload in the payload container, loading the payload container and parachute into an aerial vehicle, navigating the aerial vehicle to a location above the payload destination, and deploying the payload container and parachute from the aerial vehicle, wherein the parachute reduces a terminal velocity of the payload container.

In one example, a parachute for the delivery of a payload may include a canopy resistant to creasing formed from a single material, one or more elongated features extending from a periphery of the canopy, one or more attachment features located on an end of each of the elongated features and configured to attach to a payload, and wherein the attachment features are defined by a portion of the elongated feature.

In one example, a payload container for the aerial delivery of a payload may include a plurality walls separated by one or more boundary edges, the plurality of walls manipulable about the boundary edges to define a compartment, an engagement feature to receive a feature of a parachute defined by a portion of the one or more walls, and wherein one of the plurality of the walls overlaps a portion of the engagement feature to support the engagement feature.

A number of feature refinements and additional features are applicable in the first aspect and contemplated in light of the present disclosure. These feature refinements and additional features may be used individually or in any combination. As such, each of the following features that will be discussed may be, but are not required to be, used with any other feature combination of the first aspect.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

The description that follows includes sample systems, methods, and apparatuses that embody various elements of the present disclosure. However, it should be understood that the described disclosure may be practiced in a variety of forms in addition to those described herein.

The aerial delivery system included herein generally relates to the delivery of a payload container from an aerial vehicle at a payload destination. The aerial vehicle may release a payload assembly from a position above the payload destination (e.g., when flying or hovering above the location). The payload assembly includes a payload container and a parachute. The descent of the payload container may be slowed or the terminal velocity may be reduced by the parachute attached to the payload container.

The parachute may include a canopy that inflates or arranges itself to capture air or generate aerodynamic drag to slow the descent of the payload container. One or more legs may extend from the canopy and include attachment features to attach or connect to an engagement feature or anchor of the payload container, e.g., loops or end portions configured to engage with corresponding features on the payload container. In some instances, the attachment features may be defined without the use of adhesives (e.g., welding or die cutting).

The parachute may be made from a thin and lightweight material (e.g., a polymer such as low density polyethylene) to reduce the volume of the parachute and/or the total weight of the aerial delivery system. The reduced weight of the parachute may allow for a proportionally larger parachute that provides a greater reduction in terminal velocity.

The payload container may be arranged to define an internal volume to receive or retain a payload for delivery. The payload container may be formed of a deformable or foldable material and may be formed into a shape to define the internal volume. The payload container may include engagement features to receive or attach the parachute to the payload container, e.g., barbs or extensions that receive loops of the parachute. A retention portion may be positioned over the engagement features to further assist in retaining the parachute to the payload container (e.g., prevent disengagement during delivery) and/or to support the engagement features.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

Figure 1:
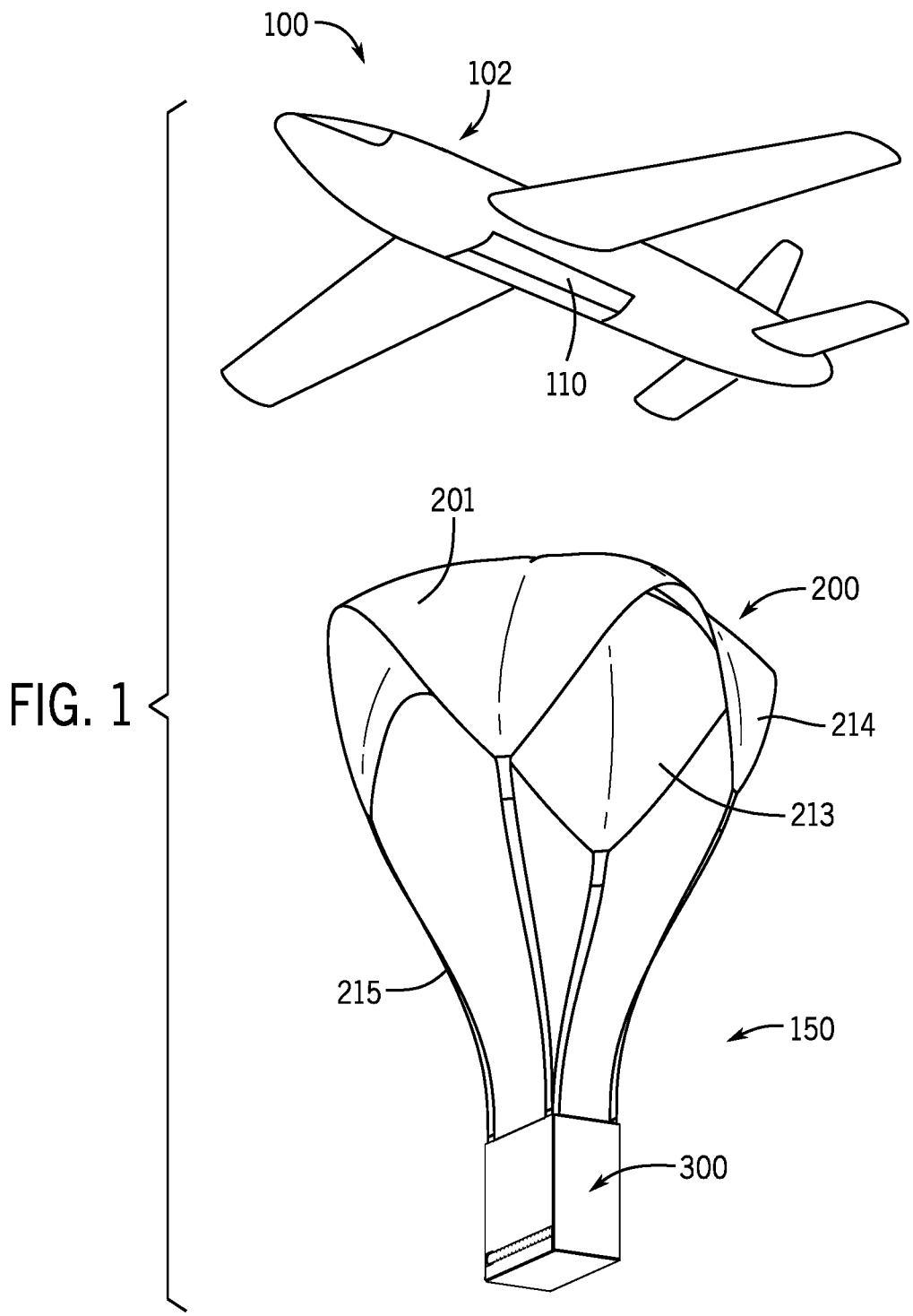
FIG. 1 illustrates and example aerial delivery system including an aerial vehicle and a deployed payload assembly.

FIG. 1 illustrates an example aerial delivery system 100. The aerial delivery system 100 may include an aerial vehicle 102 to carry a payload from a payload receiving or storage location (e.g., warehouse, shipping location, or the like) to a payload delivery location (e.g., residential area, medical facility, business area, or other location, such as a ground location). The aerial vehicle 102 may include a payload holding assembly 110 to carry a payload assembly 150 during flight from the receiving location to the delivery location. The payload housing assembly may be a portion of the fuselage or housing of the aerial vehicle 102 that forms a cavity or reception area to receive the payload assembly 150. The payload assembly 150 includes a payload container 300, payload, and/or a parachute 200. The payload may be one or more of a goods (e.g., consumer products, food such as a meal kit, groceries or to-go order, medical supplies), animals (e.g., pets, wild animals), and/or or a person. In other words, the payload may be substantially anything capable of being lifted and transported via the aerial vehicle 102 and the examples described herein are meant as illustrative only. It should be understood variations to the aerial vehicle 102, payload container 300, or the like, may be based on the type and weight of the payload as well as flight conditions. The aerial vehicle 102 or one or more components of the payload assembly 150 may be selected based on a size or weight of the payload.

At a position above or near the payload delivery location the payload container 300 (e.g., a vertical or aerial position raised above a ground location) may be deployed from the aerial vehicle 102, e.g., a hatch of the payload holding assembly 110 may open to allow the payload assembly 150 to fall under the force of gravity from the aerial location to the ground or delivery location. In some examples, the aerial vehicle 102 may include an ejection mechanism, such as a spring or burst of air, to eject the payload assembly 150 from the aerial vehicle 102. The ejection mechanism may assist in inflating the parachute 200 as well. As the payload assembly 150 falls towards the delivery location the parachute 200 inflates due to the air being captured by the parachute, reducing a terminal velocity of the payload container 300. Such velocity reduction allows the payload assembly 150 to travel safely from the aerial location to the ground location in a controlled manner, helping to reduce a risk of damage to the payload housed within the assembly 150.

Figure 2:
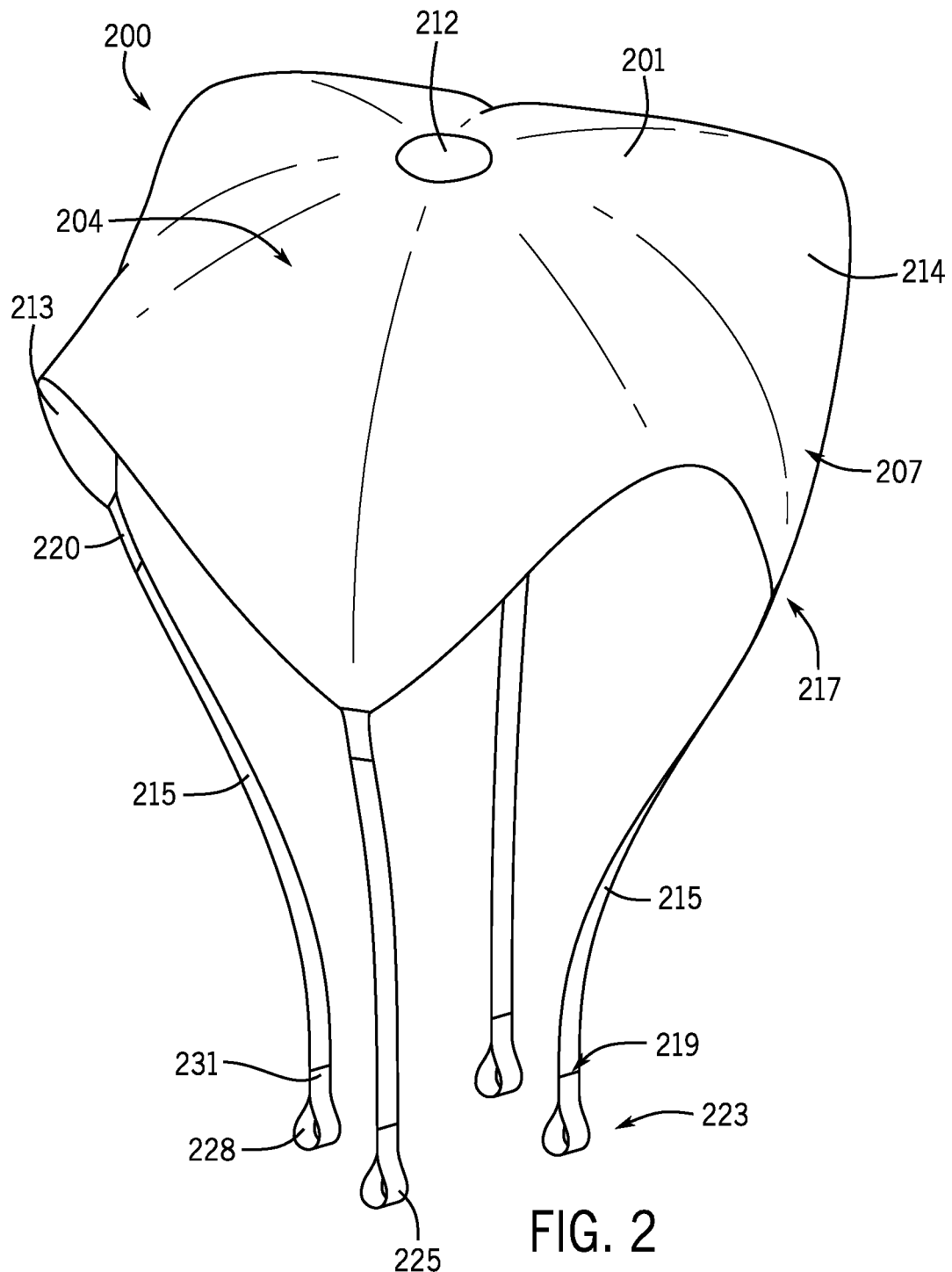
FIG. 2 illustrates a perspective view of an inflated parachute.
Figure 3A:
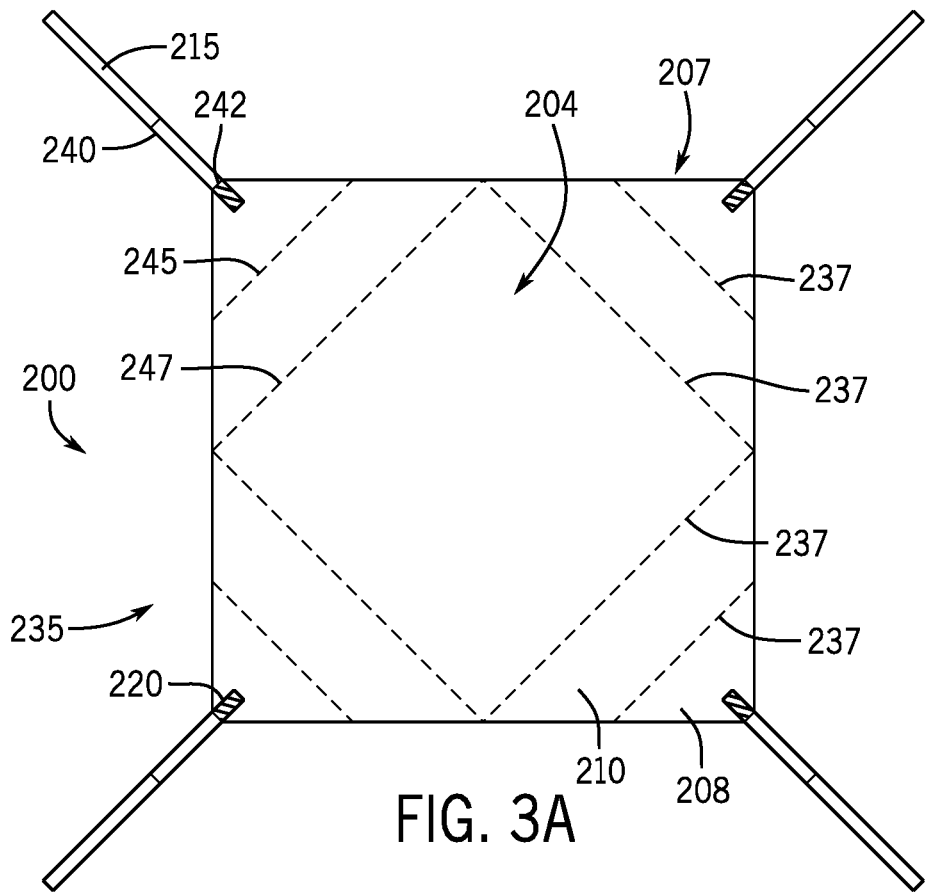
FIG. 3A illustrates a plan view of an unfolded parachute.

FIG. 2 depicts an example of the inflated parachute 200. FIG. 3A depicts an example of the parachute 200 in an uninflated and unfolded configuration 235. The parachute 200 may be folded or compressed to have a reduced dimension to fit in the aerial vehicle 102 (e.g., within the payload holding assembly 110) and/or to prepare the parachute 200 for inflation after deployment.

The parachute 200 includes a canopy 201 having a bottom surface 213 and a top surface 214. The canopy 201 may be shaped based on desired aerodynamic properties and/or the payload container 300 or payload weight. In one example, the canopy 201 is square or rectangular shaped in the unfolded or first configuration 235 (see, FIG. 3A). The canopy 201 may have a central region 204 and one or more peripheral or tie down regions 207. The central region 207 may define a spill aperture 212 that extends through the canopy 201. In one example, the spill aperture 212 may be circular, but in other examples, may be rectangular or other geometric shapes. The peripheral regions 207 may have an outer portion 208 defining a portion of the outer edge of the canopy 201. The peripheral regions 207 may include an inner portion 210 between the central region 207 and the outer portion 208. The canopy 201 may be a single material.

The canopy 201 may be a thin material to reduce the weight of the canopy 201 and the parachute 200. The canopy 201 may be a single, integrally or monolithically formed, portion of the parachute 200. By forming the canopy 201 from a single material, boundaries in the canopy 201 between materials that may rupture or break may be eliminated or reduced. For example, boundaries such as seams lines or ties may provide uneven distributions of stresses on the canopy 201 that may cause damage of or failure of the canopy 201.

The parachute may include legs 215 extending from the canopy 201 that act to couple the parachute 200 to the payload container 300. The legs 215 may be elongated features, e.g., strips of material and include a first end 217 and a second end 219 opposite the first. The legs 215 may have a narrow width compared to their length, e.g., the legs 215 may have a length longer than their width. The legs 215 may be thin (e.g., a single layer of material) to reduce the combined weight of the legs 215 and reduce the weight of the parachute 200. Each leg 215 may be a single material. By utilizing a single material, seam lines or connections in the legs 215 that may increase the risk of ruptures or tears may be reduced or eliminated. Each of the legs 215 may be the same or have a similar configuration as any of the other legs. In one example, the parachute 200 includes four legs 215.

The legs 215 may couple to or extend from the canopy 201. The first end 217 of the legs 215 may be the portion of the legs 215 extending from the canopy 201. The legs 215 may extend from the peripheral regions 207 of the canopy 201. In some examples, the legs 215 may extend from the outer portion 208. In other examples, the legs 215 may extend along a section of both the inner portion 210 and the outer portion 208. The legs 215 may be attached to or extend from either or both of the bottom surface 213 or the top surface 214 of the canopy 201. The legs 215 may extend from the canopy 201 in an orientation to promote an even distribution of stresses on the canopy 201 during deployment. In some examples, the legs 215 are oriented at angle between 0-90 degrees relative to a side of the canopy 201. In one example, the legs 215 may extend at 45 degrees from the canopy 201.

The parachute 200 may include one or more attachment features 223 configured to connect or attach the parachute 200 to the payload container 300. The attachment features 223 may extend from, be formed with, attach to, or be heat welded to the legs 215. In one example, the attachment features 223 may be loops 225, e.g., oval or circular formations. The loop 225 may define an opening 228 extending through the attachment feature 223. The loops 225 may be a portion of the legs 215 attached back on itself. In one example, the loops 225 are defined by attaching an end the legs 215 to the second end 219 by a heat weld 231. In other examples, the loops 225 may be formed by cutting a slit or aperture in the legs 215 to define the loops 225 or other receiving structures. In another example, the attachment feature 223 may include an adhesive 226 attached to or extending from the legs 215.

The attachment features 223 may be located at the second end 219 of the legs 215. The attachment features 223 may be a portion of the legs 215 designed to attach to or engage with the payload container 300. For example, a leg 215 and an attachment feature 223 may be a single component or material. Each attachment feature 223 may be attached to or defined by a single leg 215 or, two or more legs 215 may together define a single attachment feature 223. The attachment features 223 may be oriented at an angle relative to the legs 215. As discussed below, the canopy 201 may have a comparatively larger width or length compared to the payload container 300 and the legs 215 may be oriented at an angle between the canopy 201 and the payload container 300 during deployment. By angling the attachment features 223 relative to the legs 215, stresses may be more uniformly applied to or distributed throughout the legs 215 or attachment features 223.

The parachute 200 may be a single material (e.g., formed via cutting or otherwise defining the parachute from a larger material sheet) or each of the canopy 201, legs 215. In some examples, the parachute 200 components may be cut from a single rectangular sheet of material. The length of the legs 215 may correspond to or be similar to the width or length of the canopy 201, such that the legs 215 and canopy 201 may be cut without generating waste or scrap from the sheet of material. In other examples, the attachment features 223 may be one or more sections of materials heat welded or bonded together. Each of the sections may be the same material. The material of the parachute 200 components may be tear resistant, e.g., able to stretch without tearing or shearing, or breaking into thin pieces. For example, the parachute 200 material may have elastic properties, such as a polymer or plastic. A tear resistant or stretchable material may allow the components of the parachute 200 to be thin compared to a length or width of the component. As discussed below, the parachute 200 may be folded for storage in an aerial vehicle 102 prior to deployment. Accordingly, the material of the parachute 200 may be selected to be resistant to creasing. The material may also be recyclable. In one example, the material of the parachute 200 is a polymer such as low density polyethylene (LDPE), but could also be high density polyethylene, nylon or other synthetic polymers, acrylics, or any other suitable polymer material.

The material of the parachute 200 may also be capable of heat bonding or heat welding, such as to allow various features to be defined by coupling sections of the material together without the use of other adhesives. For example, the parachute 200 material may be a thermoplastic. In one example, each of the legs 215 and the canopy 201 are connected by a heat weld 220. In one example, the attachment features 223, such as the loops 225, are a portion of the legs 215 connected back onto the legs 215 by a heat weld 231. By heat welding the legs 215 to the canopy 201, or a portion of the legs 215 to define the attachment features 223, the connections may be more secure over a wider range of temperature or weather conditions. By utilizing the one or more heat welds that do not require adhesives, the connections between features of the parachute 200 may last longer than an adhesive bond, as an adhesive may become brittle or fail over a range of temperatures (e.g., in cold or hot conditions). By heat welding the same material onto itself, each heat weld 220, 231 may also provide a strong connection between components. For example, the strength of the bond of the heat weld 220 between the legs 215 and the canopy 201 may be greater than the tensile or peel strength of the legs 215. The strength of the heat weld 231 forming the loops 225 may be greater than the tensile or peel strength of the legs 215. The heat welds may reduce the weight of the parachute 200 by eliminating an adhesive applied at the same location. The heat welds may reduce the per unit cost of the parachute 200 by eliminating the need for a separate adhesive material. The heat welds 231, 220 may also allow the parachute 200 to be recycled more easily in contrast to an adhesive or fastener which may prevent a portion of the parachute 200 from being recycled.

The parachute 200 may be sized for a variety of payload weights or sizes. For example, the size of a component of the parachute 200 may be selected, or arranged, to provide a range of drag forces to reduce the terminal velocity of the payload assembly 150. The components of the parachute 200 may be selected or arranged to provide or withstand a range of forces or stresses caused by the weight of the payload assembly 150 or drag forces. For example, when in a flat or unfolded and uninflated configuration 235, the canopy 201 may have a first or flat area. When the canopy 201 is inflated during descent, such as may be shown in FIG. 1 or FIG. 2, the canopy 201 may define a second, or frontal area, which is generally less than the first or flat area. The frontal area may include or correspond to the central region 204 of the canopy 201. The drag force of the parachute 200, and the corresponding reduction in the terminal velocity of the payload assembly 150, may increase linearly with respect to an increase in the frontal area of the canopy 201. Accordingly, for a given payload weight, or a range of payload weights, a canopy 201 having a certain frontal area may be selected for use.

For a common, or middle, range of payload weights or sizes, the canopy 201 may have a first size such as first length, a first width, or a first thickness. The first size of the canopy 201 may be arranged to have a first frontal area to generate a range of drag forces for a range of sizes or weights of the payload or payload container 300. The legs 215 may have a first width or a first thickness, or in some examples a first length. The attachment features 223 may also have a first size, such as a first length or a first width, to correspond with the first size of the canopy 201. The legs 215 or attachment features 223 may be selected or sized to withstand a predicted range of stresses for a canopy 201 size, a given payload, a weight of a payload container 300, or for a predicted range of drag force generated by the canopy 201. The cross sectional area of the legs 215 or attachment features 223 may be proportional to the frontal area of the canopy 201 to keep stress on the legs 215 or attachment features 223 within a selected range. For example, the cross sectional area of the legs 215 and/or attachment features 223 may have a linear change in size for a change in size of the frontal area of the canopy 201 because, as discussed above, the drag force of the parachute 200 may increase linearly or substantially linearly with an increase in the frontal area of the canopy 201. In one example, the thickness of the legs 215 or attachment features linearly corresponds to the size of the canopy 201 or frontal area. For the first size, either of the canopy 201, legs 215, or attachment features 223 may have the same thicknesses or different thicknesses.

In some examples, the payload may have a mass up to 4 kg and may have a mass of approximately 3 kg. The legs 215 and the attachment features 223 may have a thickness approximately between 0.15 mm and 0.35 mm. In one example, the legs 215 and attachment features 223 have a thickness of approximately 0.25 mm. The legs 215 and the attachment features 223 may have a width approximately between 15 mm and 25 mm. In one example, the legs 215 and attachment features 223 have a width of approximately 25 mm. The canopy 201 may have a flat area of between approximately 0.75 and 1.25 square meters and a frontal area between approximately 0.25 m and 0.75 square meters. In one example, the canopy 201 has a flat area of approximately 1 square meter and a frontal area of approximately 0.5 square meters. The canopy 201 may have a thickness between approximately 0.02 mm and 0.05 mm. In one example, the canopy has a thickness of approximately 0.038 mm.

For heavier or larger payloads, the parachute 200 may have a second size with a comparatively wider or longer canopy 201 to define an increased frontal area to provide increased drag or a greater reduction of the terminal velocity of the payload container 300 during descent. For example, the canopy 201 may have a second length greater than the first length or a second width greater than the first width to provide a greater flat area or frontal area. In some examples, the canopy 201 may have a second, greater, thickness such as by layering two or more material layers or by using a larger volume of the material for the canopy 201. To account for the increased drag forces or a heavier payload, the legs 215 may have a second size that is wider, e.g. have a second width greater than the first width, or thicker, e.g. have a second thickness greater than a first thickness, to define a greater cross sectional area to maintain a stress on the legs 215 within a range of stresses or below a stress threshold under the increased tension on the legs 215. The legs 215 may also have a greater length to account for an increased width or length of the canopy 201 to reduce an angle between the canopy 201 and a connection with the payload container 300. The attachment features 223 may have a second size greater than the first size, e.g. the attachment features 223 may be made from a thicker material or more robustly connected to the legs 215 to account for increased forces or stresses. For the legs 215 and the attachment features 223, their respective thicknesses may be increased by a greater proportion than their respective widths for a heavier payload. For a range of widths of the legs 215 or attachment features 223, the distribution of stresses across the width may be less uniform as the width increases, accordingly, it may be beneficial to increase the thickness of the components to by a greater proportion than a width of the legs 215 or attachment features 223 to define a greater cross sectional area. The attachment features 223 may also have second orientation for the heavier payload or larger canopy 201. For example, the attachment features 223 may be oriented at a different angle relative to the legs 215 to accommodate for geometric variations.

For lighter or smaller payloads, the canopy 201 may have a third configuration such that the canopy 201 is shorter or narrower to reduce an amount of material used. The canopy 201 may also be smaller to maintain accurate delivery to the payload destination or reducing the degree to which wind may alter the course of the payload assembly 150 during descent. With the smaller canopy 201, the legs 215 may be thinner or narrower to reduce an amount of material used. The attachment features 223 may also be arranged for the reduced drag force or lighter payload weight. For example, for smaller payload sizes the opening 228 may be formed by a cut or incision in the legs 215 rather than by the heat weld 231 for faster assembly or manufacturing.

With reference to FIGS. 3A-3H, the parachute 200 may be folded to reduce a size of the parachute 200 for storage, such as at a payload storage location or in the aerial vehicle 102. The folding may be arranged for consistent or reliable inflation of the parachute 200 during deployment.

With reference to FIG. 3A, an example parachute 200 is shown in an unfolded or flat configuration 235. FIG. 3A may show the bottom surface 213 of the canopy 201. Initial folds 237 may be shown by dashed lines 237. For example, the legs 215 may fold about at a medial fold 240 and an end fold 242. The canopy 201 may fold along peripheral folds 245. The peripheral folds 245 may separate the outer portion 208 from the inner portion 210 of the peripheral regions 207. The canopy 201 may fold along central folds 247. The central folds 247 may separate the peripheral regions 207 from the central region 204. As discussed above, the area of the central region 204 may be similar to or correspond to the frontal area of the canopy 201 when the parachute 200 is inflated.

Figure 3B:
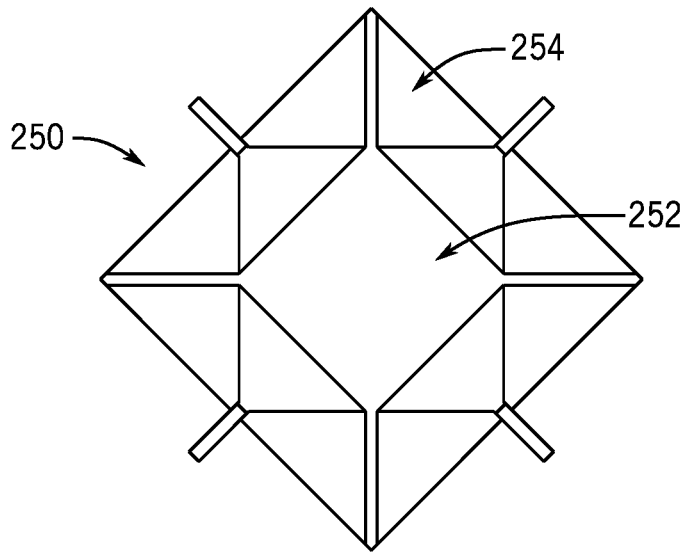
FIG. 3B illustrates a plan view of the parachute in a folded configuration.

The parachute 200 may be folded along the initial folds 237, as shown in FIG. 3A, to define a partially folded parachute 250, as shown in FIG. 3B. To fold the parachute 200, the peripheral regions 207 may fold about the central folds 247 to place the bottom surface 213 of the peripheral regions 207 against the top surface 214 of the central region 204. The outer portion 208 of the peripheral region 207 may be folded about the peripheral folds 245 so that the top surface 214 of the outer portion 208 contacts the bottom surface 214 of the inner portion 210. The legs 215 may fold about the end folds 242 and the medial folds 240 to extend outward from the parachute 200.

Figure 3C:
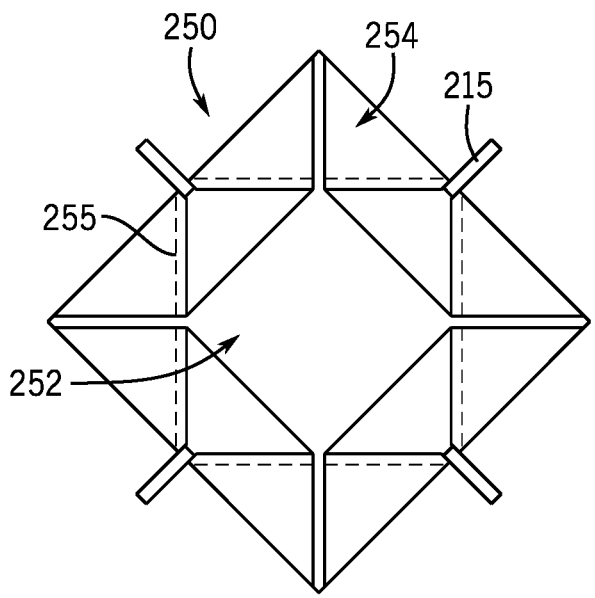
FIG. 3C illustrates a plan view of the folded parachute of FIG. 3B and fold lines.
Figure 3D:
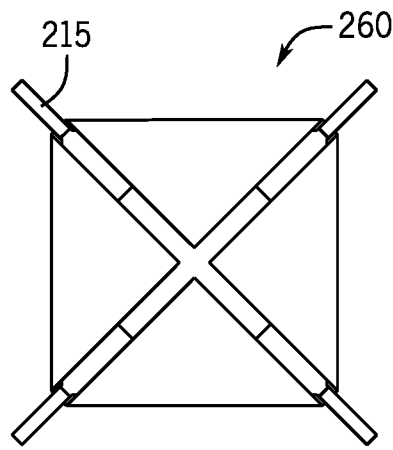
FIG. 3D illustrates a plan view of the parachute of FIG. 3C folded along the fold lines of FIG. 3C.

As shown in FIG. 3B, the partially folded parachute 250 may define a second central region 252 and one or more second peripheral regions 254. The area defined by the perimeter of the canopy 201 in the partially folded configuration 250 may be similar to or correspond to the frontal area of the canopy 201 when the parachute 200 is inflated. FIG. 3C may show the partially folded parachute 250 and second folds 255, as represented by dashed line 255. The second peripheral regions 254 may be folded about the second folds 255 to contact the second central region 252. FIG. 3D shows partially folded parachute 250 folded along second folds 255 to define partially folded parachute 260.

Figure 3E:
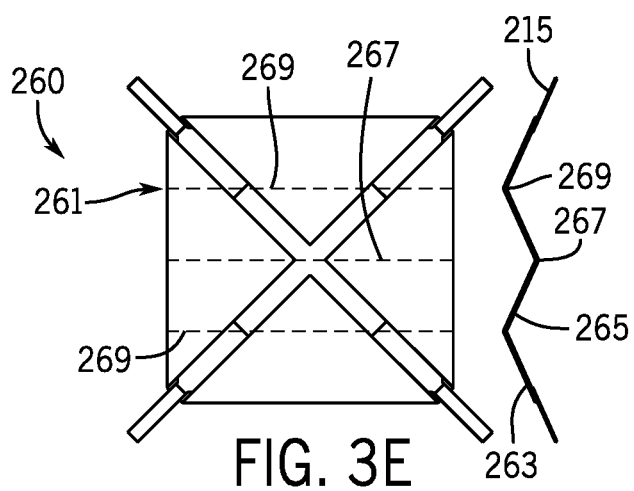
FIG. 3E illustrates a plan view of the folded parachute of FIG. 3D and fold lines.
Figure 3F:
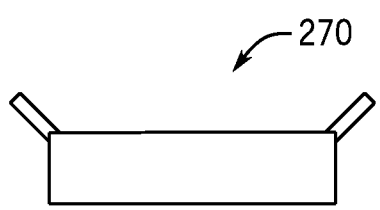
FIG. 3F illustrates a plan view showing the parachute of FIG. 3E folded along the folds lines of FIG. 3E.

FIG. 3E shows partially folded parachute 260 and third folds 261. The third folds may include a central fold 267 and panel folds 269. The partially folded parachute 260 may include edge panels 263 and interior panels 265. The edge panels 263 may be folded towards the interior panels 265 about the panel folds 269. The parachute 260 may be folded downward about the central fold 267. FIG. 3F shows partially folded parachute 260 folded along third folds 261 to define partially folded parachute 270.

Figure 3G:
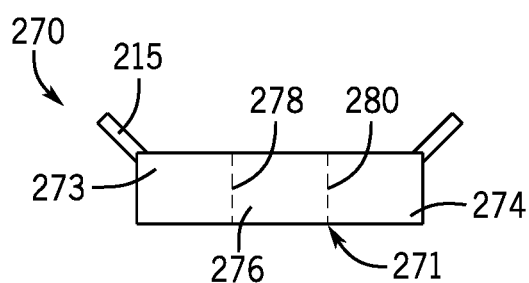
FIG. 3G illustrates a plan view of the folded parachute of FIG. 3F and fold lines.
Figure 3H:
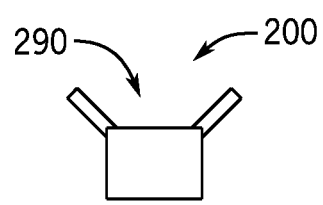
FIG. 3H illustrates a plan view showing the parachute of FIG. 3G folded along the folds lines of FIG. 3G.

FIG. 3G shows the partially folded parachute 270 of FIG. 3F. The partially folded parachute 270 may be folded along the fourth folds 271. The fourth folds 271 may include a left fold 278 and right fold 280. The left fold may 278 may separate an outer region 273 from a middle region 276. The right fold 280 may separate the middle region 276 from outer region 274. The outer region 274 may be folded about right fold 280 to contact the middle region 276 in one direction and the outer region 273 may be folded about an opposite second direction to contact the middle region 276 to define the folded parachute 290 as shown in FIG. 3G.

Figure 4:
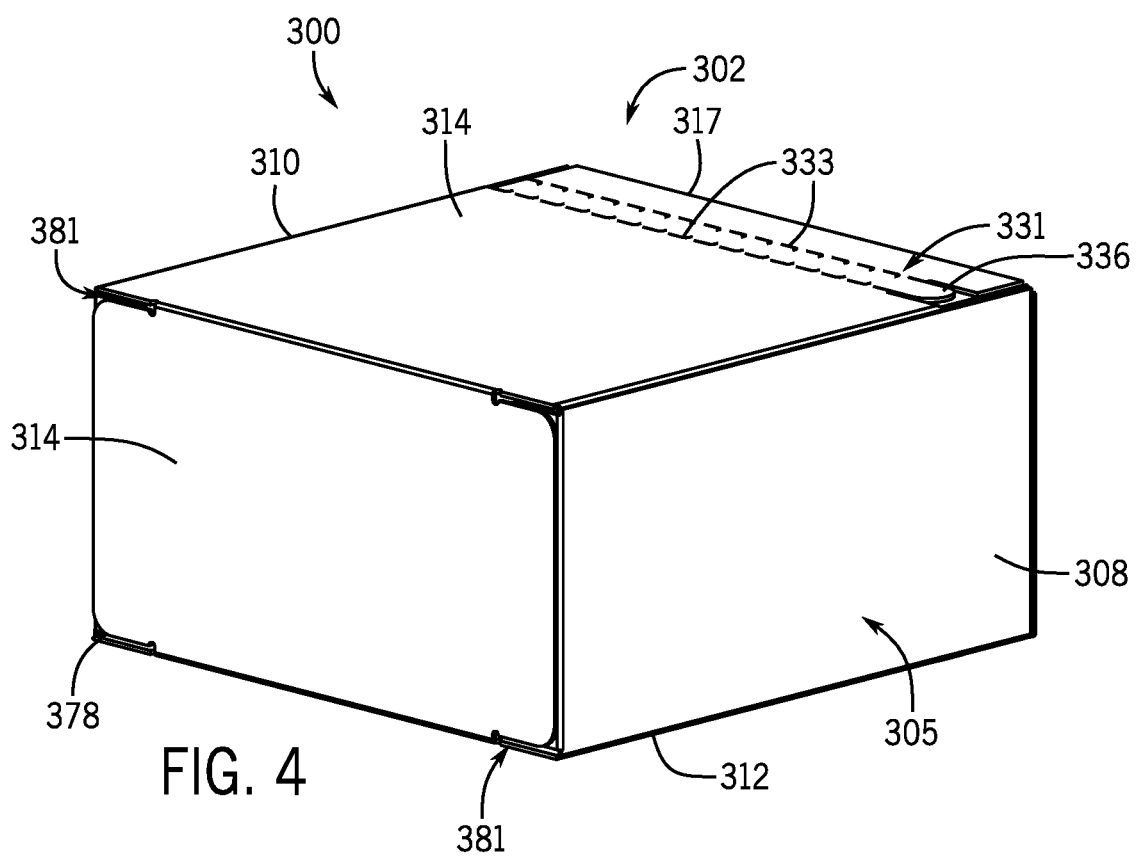
FIG. 4 illustrates a perspective view of a payload container.
Figure 5:
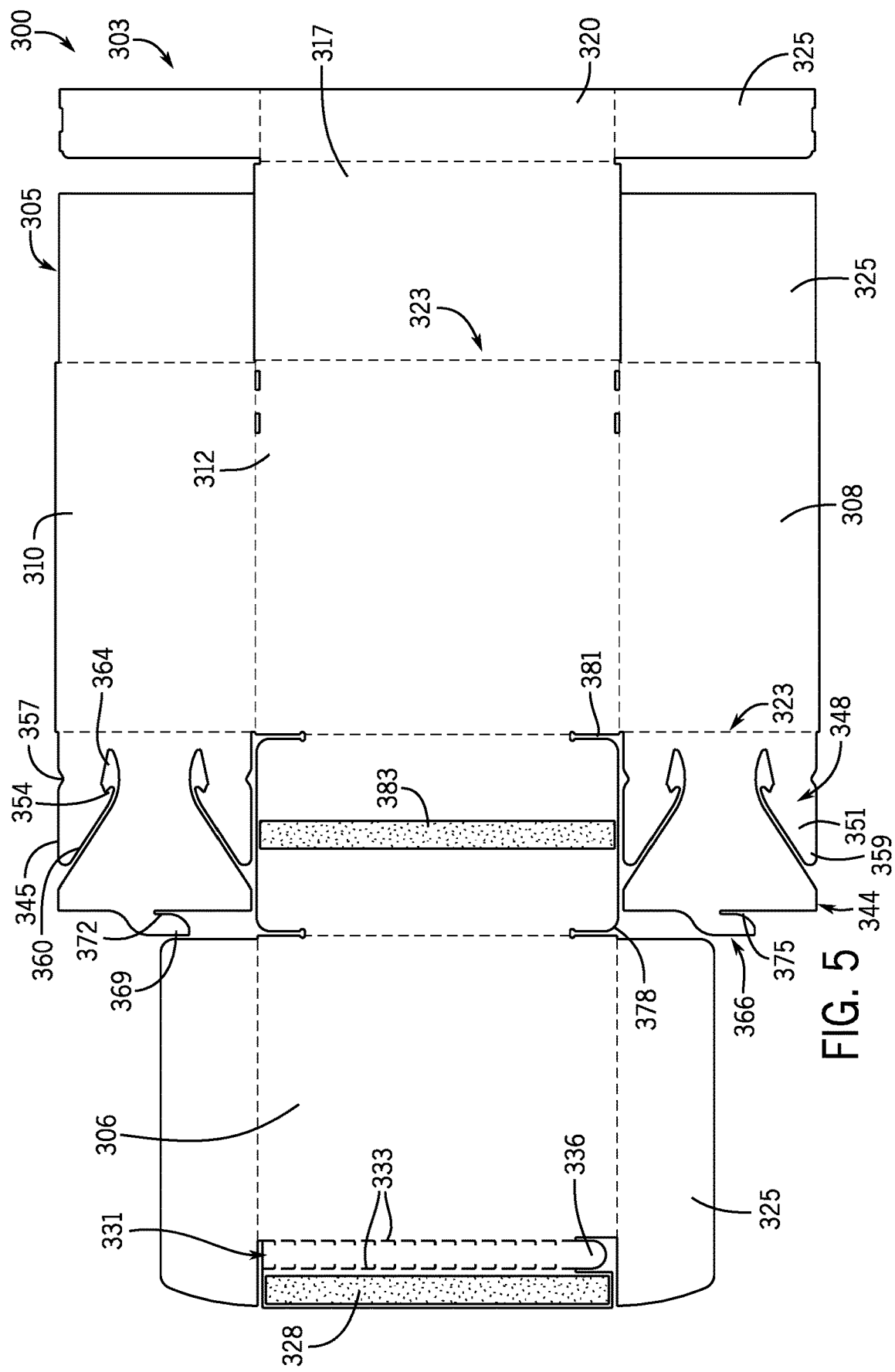
FIG. 5 illustrates a plan view of an example payload container of FIG. 4 in a first configuration.
Figure 6:
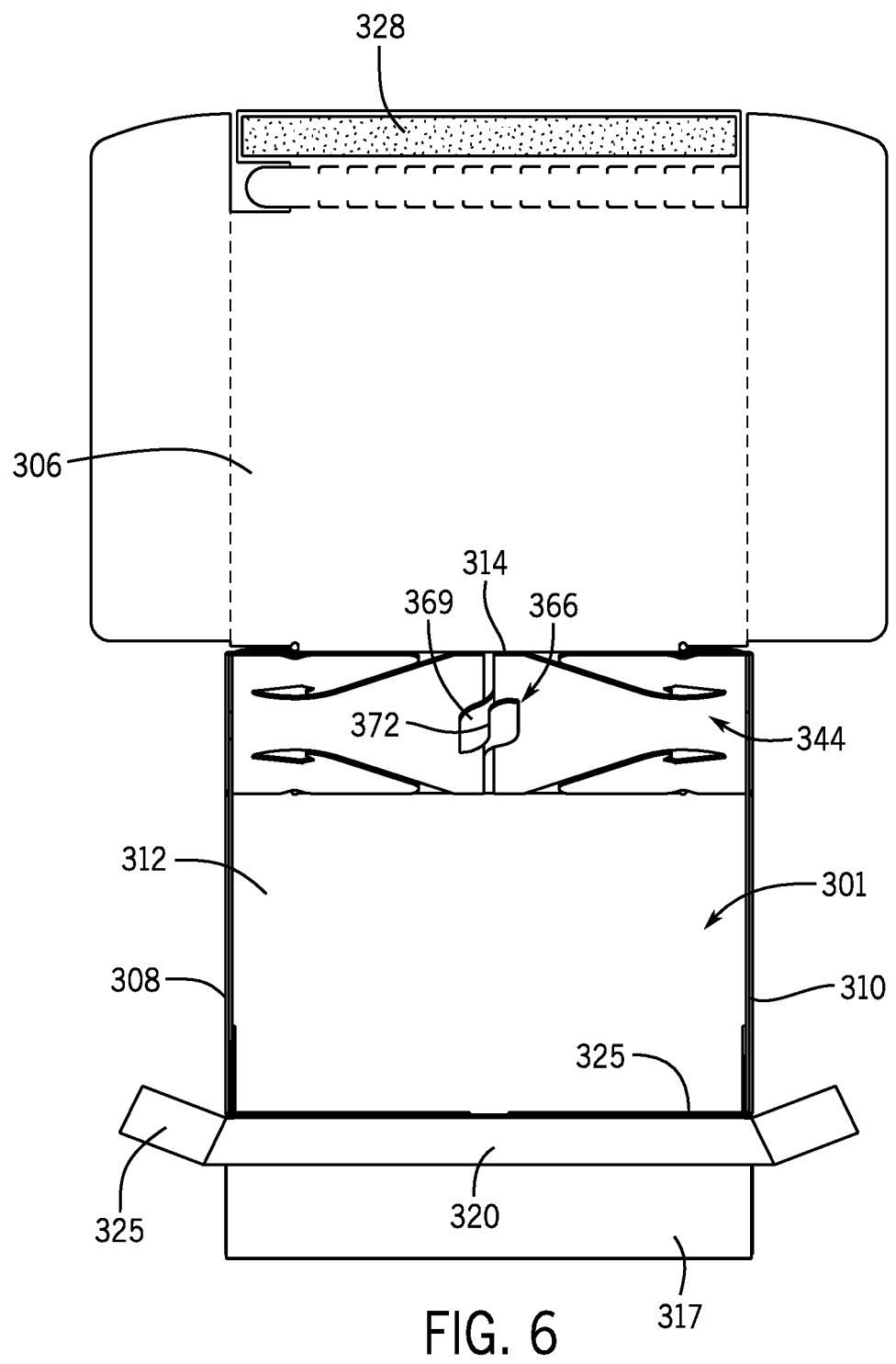
FIG. 6 illustrates a top-rear perspective view of a partially assembled payload container.

With reference to FIGS. 4-6, an example payload container 300 or delivery box is shown. The payload container 300 may include a plurality of sections, walls, or panels 305 that may be arranged to define an internal volume 301 or compartment to receive a payload. The payload container 300 may have a variety of shapes and orientations, such as circular, rectangular, rectilinear, or curved. The payload container 300 may be shaped or selected to correspond to the shape of the payload. In some examples, the payload container 300 is shaped or selected for aerodynamic properties, such as stability during descent or drag. In one example, the payload container 300 or panels 305 are rectangular. FIG. 4 shows the payload container 300 in an example assembled configuration 302. FIG. 5 shows the payload container 300 in an example unassembled or first configuration 303. FIG. 6 shows the payload container 300 in a configuration ready to receive a payload.

The plurality of sections, walls, or panels 305 may include a top wall or panel 306, a right panel 308, a left panel 310, a bottom panel 312, a rear panel 314, and a front panel 317. The panels 305 may be separated by or bent, oriented, or folded about boundary edges 323 to assemble the payload container 300. The boundary edges 323 may be fold lines, joints or hinges, or connections between the panels 305. One or more panels 305 may overlap or contact a portion of other panels 305 to provide support or to reinforce the panels 305 or payload container 300 as a whole.

The payload container 300 may be a single material or one or more materials assembled together. For example, the payload container 300 material may be a rigid material to maintain a self-supporting structure (e.g., box or other receiving structure). The payload container 300 material may be foldable, deformable, or rotatable to define different or separate walls or panels 305, e.g. the material may be folded up to or over 90 degrees to define a right panel 308 and the bottom panel 312. The container 300 material may be lightweight to allow a larger payload to be carried for a given parachute 200 size (i.e., the weight of the container 300 may not be a substantial contributor to the overall weight of the assembly). Accordingly, the material may be a paperboard, cardboard, corrugated cardboard, or a plastic such as HDPE. The payload container 300 material may have a coating to provide various characteristics. For example, the payload container 300 may have a water resistant coating or coated with a water resistant substance to prevent damage to the payload or the container 300 during delivery. The container 300 may be coated with a wear resistant material to prevent damage to the payload container 300 or payload during transportation in the aerial vehicle 102 or during descent or landing of the payload assembly 150. In some examples, the coating or material may provide an aesthetic purpose such as defining or including shapes, colors, or symbols indicating a shipper, a payload or payload type, or to provide contrast at a delivery location.

The payload container 300 may include one or more connection panels 344. In some examples, the right panel 308 includes a first connection panel 344 and the left panel 310 includes a second connection panel 344. The connection panels 344 may be an end or portion of the right panel 308 or left panel 310. The payload container 300 may include one or more engagement features or anchors 348. The engagement features or anchors 348 may be located on the panels 305 or may define a portion of a panel 305. In some examples, the engagement features 348 are located on the connection panels 344. The anchors 348 may include a parachute receiver 351. The parachute receiver 351 may be separated from the connection panel 344 by a channel 360 or gap extending into the connection panel 344 from an outer edge 345 of the connection panel 344. The parachute receiver 351 may be an elongated feature such as a bar, hook, or strip of material. The receiver 351 may have a tapered shape or a shape with a varying width. For example, the receiving or first end 359 of the receiver may have a first width less than a width of a portion of the receiver located away from the receiving end 359. The parachute receiver 351 may be shaped to slidably receive a feature over or around the receiver 351. For example, a feature may fit over or under the receiving end 359 or may enter the channel 360 adjacent the receiving end 359. The feature may be guided along a portion of the channel 360 and be retained in the channel 360 by the receiver 351.

In some examples, a reception aperture 363 may be defined by the connection panel 344 at an interior end of the channel 360. In some examples, the parachute receiver 351 may include a parachute catch 354 that extends from the parachute receiver 351 and away from or transverse to the receiving end 359, such as into the reception aperture 363. A guide 357 may be defined by an outer edge 345 or perimeter of the parachute receiver 351. The guide 357 may be a depression or divot in the parachute receiver 351. The guide 357 may be adjacently spaced from the parachute catch 354. The parachute catch 354 and the guide 357 may be on opposite sides of the parachute receiver 351.

In some examples, two or more panels 305 may include corresponding coupling features or tabs 366 to engage the panels 305 together. In one example, the connection panel 344 may define a coupling feature or coupling tab 366. The coupling feature 366 may be an extension 369 from a side of a panel 305. The extension 369 may be angled or curved such that an inner edge 372 of the extension 369 defines a recess 375 between the extension 369 and the outer edge 345 of the connection panel 344.

One or more panels 305 may include features to assist in maintaining a configuration of the panels 305 or securing panels 305 during assembly of the payload container 300. For example, one or more of the panels 305 may be shaped to hook or couple to another panel 305 (e.g., folded interlocks). In one example, the wings 325 of the panels may interconnect to assemble the payload container 300. In some examples, one panel 305, such as the top panel 306, may include an adhesive 328, or fastener, to engage or attach the top panel 306 to a second panel 305. The adhesive 328 may be attached, applied to, or included in the top panel 306. In one example, the adhesive 328 may be located near or along one side of the top panel 306. The adhesive 328 may be an elongated strip extending across a portion of the width of the top panel 306. In some examples, the adhesive 328 may be covered by a removable film or paper that may be quickly removed to activate or expose the adhesive 328 for application to a second panel 305 of the container 300. One or more panels 305 may include a closure portion 320 to receive or engage with the adhesive 328. The closure portion 320 may be a region of a panel 305 or a feature extending from a panel 305 shaped to receive or engage with the adhesive 328. In one example, the front panel 317 may include the closure portion 320.

One or more panels 305 may provide an opening system 331 for accessing the internal volume 301 when the container 300 is in the assembled configuration 302. In one example, the top panel 306 includes the opening system 331. The opening system 331 may include a plurality of perforations 333 aligned across a portion of a length of a panel 305. Two rows of perforations 333 may be oriented adjacent each other such that a pull tab or pull strip 336 is defined between the perforations 333. The pull strip 336 may be actuated by a user to separate the strip 336 from the panel 305 along the perforations 333 for selective access to the internal volume 301. The opening system 331 may be located adjacent the adhesive 328 or a fastener such that by the actuation of the pull strip also separates the panel 305, or top panel 306, from the adhesive 328 to provide access to the internal volume 301.

One or more panels 305 may include features to provide access to or expose a feature of an underlying panel 305. For example, one or more panels may define a slot 381 providing an opening to an underlying panel 305. In one example, the rear panel 314 defines slots 381. The panel 305, such as the rear panel 314, may have an outer edge or outer edges 378. The outer edges 378 may be spaced from a fold line 323 or an edge of an adjacent panel 305. The spacing between the outer edges 378 and the adjacent panel 305 or fold lines 323 may define the slots 381.

One or more panels 305 may include wings 325 to assist in enclosing the interior volume 301 during assembly of the payload container 300. The wings 325 may also provide increased strength or rigidity to the payload container 300. The wings 325 may be extensions or portions of the panels 305 configured to fold about one or more fold lines 323. The wings 325 may be folded such that when a first panel 305 is arranged next to a second panel 305 the wings 325 overlap the second panel 305 to eliminate or reduce any gaps between panels 305 that may allow debris or moisture into the interior volume. The wings 325 may also be arranged to act as a supporting structure between two panels 305 to prevent the panels 305 from buckling outward due to pressure from a payload within the internal volume 301 or buckling inward and impinging on the internal volume 301. In some examples, the top panel 306 includes wings 325. In some examples, the right 308 or left panels 310 may include wings 325 or the connection panels 344 may also function as wings 325.

To assemble the payload container 300 from the unassembled configuration 303, as shown in FIG. 5, to the assembled configuration 304, the panels 305 may be bent or rotated about fold lines 323. For example, the right panel 308 or the left panel 310 may fold towards the bottom panel 312. The connection panels 344 may bend about fold lines 323 to an orientation transverse to the orientation of the rest of the right 308 or left panel 310. The connection panel 344 of the right panel 308 may engage with or attach to a corresponding connection panel 344 of the left panel 310. For example, the coupling tabs 366 may interconnect the connection panels 344. To interconnect the connection panels 344, the extensions 369 may be arranged with the inner edges 372 positioned in the corresponding recesses 375 of the corresponding connection panel 344, such as may be shown in FIG. 6. In this position, each corresponding extension 369 may retain the other to prevent the connection panels 344 from separating.

The front panel 317 may be rotated about fold lines 323 to abut or engage an end of the right 308 or left panels 310, or wings 325 of the panels. Front panel 317 wings 325 may overlap or abut wings 325 of the right 308 and left panels 310. The front panel 317 wings 325 may facilitate in holding the position of the front panel 317 relative to the right 308 and left panels 310 without the need of an adhesive, or before an adhesive can be applied to secure the configuration of the panels 305. In this configuration, as shown in FIG. 6, the internal volume 301 may be partially defined. Accordingly, a payload may be placed within the internal volume 301 prior to sealing the container 300 as described below. Padding or stuffing may be inserted with the payload to prevent the payload from moving within the internal volume 301 or to prevent damage to the payload during the delivery process.

To continue assembling the payload container 300, the rear panel 314 may be rotated about fold lines 323 to overlap the connection panels 344, 345, thereby overlapping a portion of the left 310 or right panels 308. The slots 381 of the rear panel 314 may align with or be positioned over a portion of the engagement features 348. For example, the slots 381 may be positioned over a portion of the parachute receiver 351. In some examples, an adhesive 383 may secure the rear panel 314 to the connection panels 344, 345. The adhesive 383 may be arranged to extend over the connection panels 344 to assist in securing the panels 344 together. In some examples, the adhesive 383 may extend over the coupling features or tabs 366 effectively lock the tabs 366 in place.

To continue assembling the payload container 300, the top panel 306 may be rotated about fold lines 323 to engage with one or more of the panels 305 to define the internal volume 301. The adhesive 328 may attach to the closure portion 320. In one example, the adhesive 328 secures the top panel 306 to the front panel 317. The closure portion 320 may extend from the front panel 317 such that the closure portion defines a portion of a top of the internal volume 301. When the top panel 306 is secured, the assembled configuration 302 may be defined.

Figure 7:
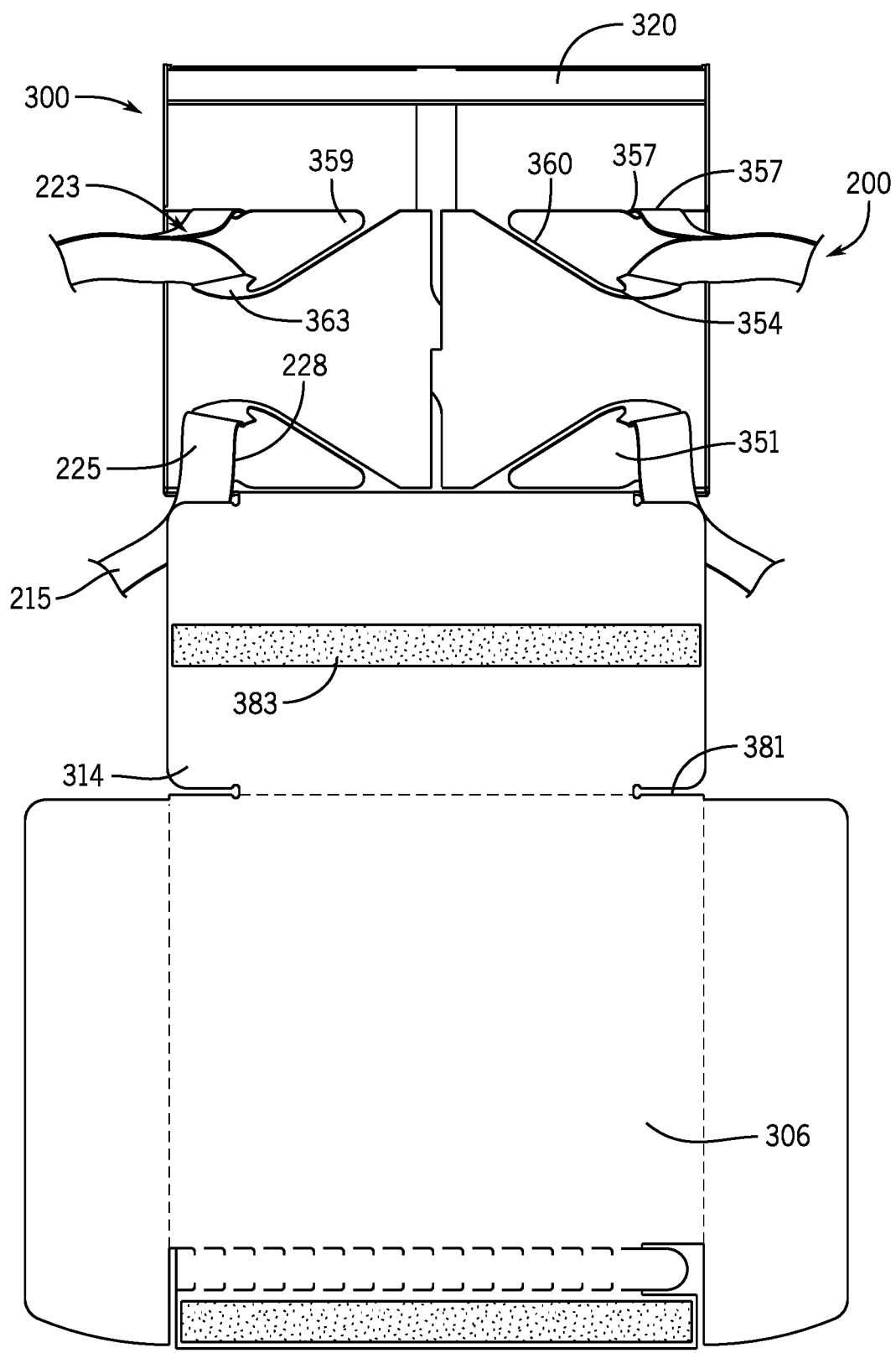
FIG. 7 illustrates a front perspective view of a partially assembled payload container with a parachute attached.
Figure 8:
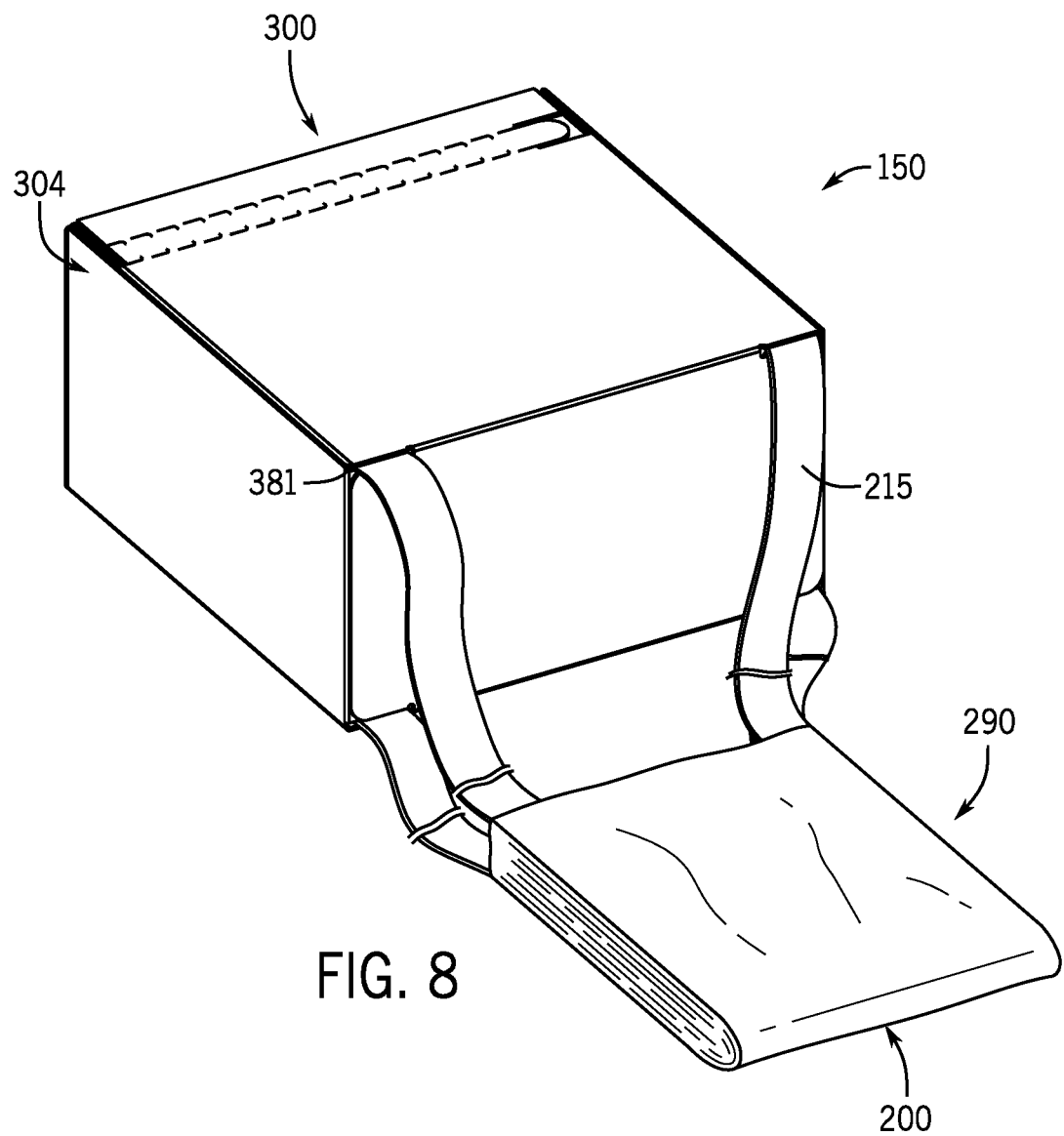
FIG. 8 illustrates a perspective view of an assembled payload container connected with a folded parachute.

FIGS. 7 and 8 may show an example parachute 200 attached to or engaged with a payload container 300. The parachute 200 may be attached in the folded configuration 290 prior to attaching to the payload container 300. In some examples, the parachute 200 may be attached during assembly of the payload container 300. A payload may be placed in the internal volume 301 before or after attaching the parachute 200.

The parachute 200 may be attached to the payload container 300 by attaching one or more attachment features 223, such as the loops 225, to one or more corresponding engagement features or anchors 348. The loops 225 may be placed on the anchors 348 after the connection panels 244 are engaged together. To attach the loops 225 to the anchors 348, the loops 225 may be threaded over the parachute receiver 351 and through the channel 360. The parachute receiver 351 may be inserted through the opening 228. The parachute receiver 351 may be oriented transverse or perpendicular to the direction the legs 215 extend from the loops 225 to assist in retaining the loops 225.

Generally, the canopy 201 may have a greater width or length than a panel 305 of the payload container 300. As a result, when the canopy 201 is inflated, e.g. after deployment, the legs 215 may be oriented at an angle relative to either the canopy 201 or anchors 348. To limit stress on the legs 215 or loops 225, the loops 225 may be oriented at an angle relative to the legs 215 to align with the angle, or likely range of angles, between the canopy 201 and the container 300 or panel 305. The angled orientation may provide a more uniform distribution of stresses on the legs 215 or loops 225. In other examples, the receiver 351 or channel 360 may be oriented at an angle. As discussed below, the attachment features 223 may alternatively include an adhesive 226 to allow for quick attachment of the parachute 200 to the container 300. The adhesive 226 may also allow for alternative orientations of the attachment features 223 relative to the panels 305, such as on an interior, exterior, or separate panels 305. The adhesive 226 may also allow the angle to be adjusted for any payload and parachute 200 combination.

In some examples, the parachute receiver 351 may be shaped to facilitate placing the loops 225 on the receiver 351 but limit or inhibit removal of the loops 225 from the receiver 351. For example, the engagement features 348 may include the parachute catches 354. The parachute catches 354 may be oriented to allow the loops 225 to slide over the receiver 351 in an attachment direction and snag or block the loop 225 from movement in a removal direction, e.g. by sliding towards the receiving end 359. The loop 225 may also be sized to fit snugly over the parachute receiver 351 or parachute catch 354 to limit or inhibit removal. The guide 357 may be defined on a side of the parachute receiver 351 opposite the catch 354 and extending towards the catch 354 to reduce or maintain a width of the receiver 351 to allow the loop 225 to pass over the receiver 351. The reception aperture 363 may also assist in retaining the loops 225. The reception aperture 363 may be shaped to retain the loops 225, such as curving under the parachute catch 354. The reception aperture 363 may also be shaped to facilitate aligning the loops 225 in the angled orientation, as discussed above. In some examples, the slot 381 may be oriented in a direction opposite or transverse to the receiver 351 such that the slot inhibits or limits movement of the loops off the receiver 351 in the removal direction. The loops 225 and the receiver 351 may provide quick alignment of the features during assembly. For example, the loops 225 may be placed on the receiver easily and quickly, and rotate relative to the receiver under tension to self-align. Because the loops 225 are heat welded or bonded, and the receiver 351 is a portion of the panels 305, the connection may be reliable in a variety of temperatures and moisture conditions. In contrast, an adhesive may become brittle or lose a bond strength at some temperatures. Moisture, such as from precipitation, may also interfere with an adhesive.

After connecting or engaging the attachment features 223 to the anchors 348, one or more panels 305 may be placed over the anchors 348 to further secure the parachute 200 to the container 300. In one example, the rear panel 314 is placed over the connection panels 344 and anchors 348. The slots 381 defined by the panel 305 or rear panel 314 may correspond with the anchors 348. The slots 381 may be positioned over or adjacent the anchors 348 to allow the legs 215 to extend from the loops 225 or anchors 348 to the canopy 201. The second panel 305, or rear panel 314, may act to support the anchors 348 or receivers 351 during deployment. For example, the drag force on the inflated canopy 201 may impart stresses on the legs 215 and cause the attachment features 223 or loops 225 to apply stress to the anchors 348. The second panel 305 or rear panel 314 may act to distribute the stress across the receiver 351 or the second panel 305. Accordingly, the connection between the parachute 200 and the container 300 may be more secure. By layering panels 305, thinner or lighter materials may be used for the container 300 or container panels 305. Optionally, the second or overlapping panel 305, such as the rear panel 316, may include an adhesive 383 to secure the panel 305 on to or over the anchors 348. The slots 381 may allow the legs 215 to extend from the anchors 348 to the canopy without bending around the panels 305, which could impart additional stress on the legs 215.

At operation, the payload delivery system 100 may be used to transport a payload to a delivery location from a payload storage location, such as a retail center, post office, or warehouse. The payload storage location may include an aerial vehicle 102 ready for flight, payloads, payload containers 300, and parachutes 200. The payload containers 300 may be stored in an assembled configuration 302 or in an unassembled configuration 303. In the unassembled configuration 303 a greater number of payload containers 300 may be stacked or stored for a given storage space. The parachutes 200 may also be stored in a flat configuration 235 or in any of the variety of folded configurations.

After receiving a delivery request or order, a payload may be determined. One or more payload containers 300 may be arranged to define an internal volume 301 sufficient to receive or carry the payload. The parachute 200 may be selected for either the size of payload container 300 or the size or weight of the payload. The payload container 300 may be assembled as described above and the parachute 200 attached, coupled, or adhered to the payload container 300. Because the parachute 200 or payload container 300 may be a single material, the payload assembly 150 may require a reduced working area to assemble. The reduced number of components may also allow for faster assembly or assembly by individuals with less training or skill. For example, by using attachment features 223 that are already shaped to attach to the payload container, such as loops 225, fewer steps may reduce the potential for error. The reduction in the number of components may also reduce waste during assembly.

The payload assembly 150 may then be loaded into the payload holding assembly 110 of the aerial vehicle 102 for flight to the delivery location. At the delivery location the payload container 300 and the folded parachute 200, 290 may be released from the payload holding assembly 110.

After releasing or deployment, the payload container 300 and the parachute 200 may begin to descend to the delivery location. During descent, the folding configuration 290 of the parachute 200 may direct air to inflate the parachute 200 to slow or reduce a terminal velocity of the payload container 300. The payload container 300 may be positioned below the parachute 200 during descent. The shape of the canopy 201 may assist in stabilizing the parachute 200 and payload container 300. For example, the spill aperture 212 may assist in inflating or maintaining an orientation of the parachute 200 relative to the payload container.

During descent, the canopy 201 may create tension on the legs 215 that may cause the attachment features 223 to exert a force on or add stress to the engagement feature or anchor 348. The second or securement panel, such as rear panel 314, may be spaced in the direction of the tension such that the securement panel braces or assists in distributing the stress or force on the anchor 348. The additional support may allow thinner panels or walls 305 to be used for the payload container 300. The securement panel may also prevent the attachment feature 223 from disengaging from the anchor 348.

At the delivery location, the recipient may access the internal volume 301 of the payload container 300, and the payload, by actuating the opening system 331. After removing the payload, the parachute 200 or the payload container 300 may be recycled. Recycling may include recycling the materials or returning the parachute 200 or payload container to the shipper for reuse. For example, because the parachute 200 may be tear and fold resistant, the parachute 200 may be used for multiple deliveries.

Figure 9:
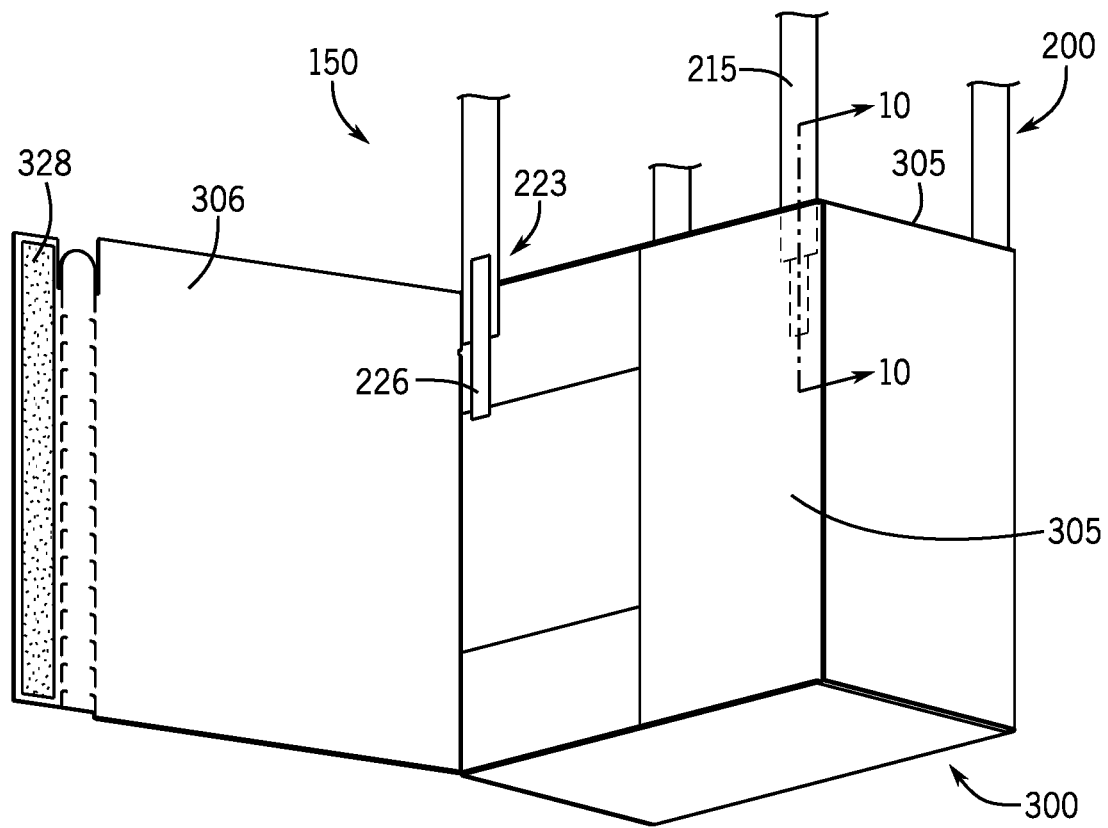
FIG. 9 illustrates a perspective view of a payload container and an adhesively attached parachute.
Figure 10:
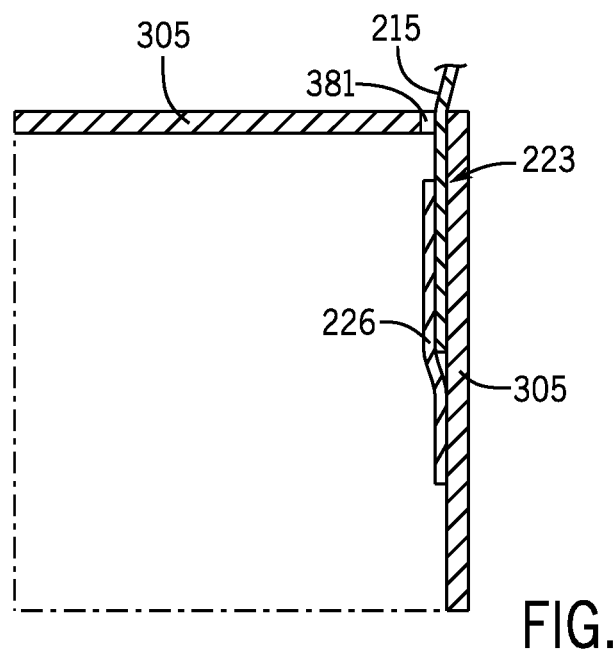
FIG. 10 illustrates a cross section view of the payload container and an adhesively attached parachute of FIG. 9.

With reference to FIGS. 9 and 10, the parachute 200 may be attached to the payload container 300 alternatively by, or in combination with, attachment features 223 including adhesives 226. The adhesives 226 may extend from or attach to the second end 219 of the legs 215. The adhesives 226 may extend from the legs 215 and attach to a panel 305 or portion of the payload container 300. The adhesive 226 may attach to an exterior or interior surface of the panel 305. The adhesives 226 and the panel 305 may be overlapped by a second panel 305, such as a top panel 306, to further secure the parachute 200 to the payload container 300. The adhesive 226 may be double sided to engage two panels 305 to secure the parachute 200 to the payload container 300 and one or more panels 305 together. The panel 305 may define a slot 381 for the adhesive 226 or leg 215 to extend out from an interior surface of a panel 305 or from beneath a second, overlapping panel 305. The portion of the panel 305 the adhesives 226 attach to may be the anchor portion 348. The adhesives 226 may extend parallel from the panel 305 or in an orientation transverse to the panel 305, thereby allowing the panel to assist in distributing stresses on the legs 215 or adhesive 226. By utilizing an adhesive 226, the parachute 200 may be attached quickly to the payload container 300 or attached to an already assembled payload container 300. The adhesives 226 may also allow a greater variety of payload containers 300 or payload container configurations to be used.

After connecting the parachute 200 to the payload container 300, the container 300 may be sealed or closed to retain a payload, as may be shown in FIG. 8. For example, the top panel 306 may then be secured to the closure portion 320 to enclose the payload in the internal volume 301. After assembly, the payload container 300 and the parachute 200 may be loaded into the payload holding assembly 110 for delivery by the aerial vehicle 102.

Other examples and implementations are within the scope and spirit of the disclosure and appended claims. For example, features implementing functions may also be physically located at various positions, including being distributed such that portions of functions are implemented at different physical locations. For example, while reference is given to front, rear, right, left, top, or bottom features it is appreciated that the directional labels are for reference only and various configurations may be within the teachings as disclosed herein. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system for aerial delivery of a payload comprising:
   a parachute comprising:
      a canopy,
      a plurality of legs extending from the canopy, and
      one or more attachment features arranged on an end of the legs; and
   a payload container comprising:
      a plurality of anchors, wherein the plurality of anchors are integral with the payload container and receive one or more attachment features;
      a plurality of panels arranged to define an internal volume, the plurality of anchors defined by one or more of the plurality of panels; and
      a securement panel, wherein the securement panel is defined by one or more of the plurality of panels overlapping a portion of the anchors to distribute stresses on the anchors.

2. The system of claim 1, wherein the securement panel defines one or more slots to allow the legs to extend from the anchors to an exterior of the payload container.

3. The system of claim 1, wherein the anchors comprise a parachute receiver to slidably receive the attachment features.

4. The system of claim 1, wherein the anchors are formed by an extension of material separated on at least two sides from an adjacent material.

5. The system of claim 1, wherein the attachment features are loops.

6. The system of claim 1, wherein the attachment features are openings slits or apertures defined in the legs.

7. The system of claim 1, wherein the attachment features are oriented at an angle relative to the legs.

8. The system of claim 1, wherein the plurality of legs and the one or more attachment features are each a single material.

9. The system of claim 1, wherein the attachment feature is an adhesive extending from the plurality of legs.

10. The system of claim 1, wherein the canopy, the plurality of legs, and the one or more attachment features are a same material.

11. The system of claim 1, wherein the canopy, plurality of legs, and the one or more attachment features are low density polyethylene.

12. The system of claim 1, wherein the canopy is resistant to creasing.

13. The system of claim 1, wherein a dimension of the canopy corresponds to a payload weight.

14. The system of claim 1, wherein a dimension of the legs corresponds to a payload weight.

15. The system of claim 1, wherein:
a dimension of the legs is linearly proportional to a frontal area of the canopy, and
the frontal area of the canopy is linearly proportional to a drag force generated by the canopy after inflation.

16. A system for aerial delivery of a payload comprising:
a parachute comprising:
one or more attachment features;
an extension between a canopy and the one or more attachment features; and
a payload container comprising:
a plurality of panels arranged to define an internal volume for housing a payload, wherein a first panel is partially covered by a second panel,
the plurality of anchors, wherein the anchors are located on the first panel and receive the one or more attachment features, and
wherein the second panel supports the first panel and the plurality of anchors and comprises one or more openings for the extension to extend from the first panel to an exterior of the payload container.

17. The system of claim 16, wherein the extension and attachment features are oriented at an angle relative to the first panel.

* * * * *